United States Patent
Aggarwal et al.

(10) Patent No.: US 12,182,623 B1
(45) Date of Patent: Dec. 31, 2024

(54) MINIMAL CONFIGURATION AND PRIORITY-BASED FRUGAL THROTTLING SOLUTION

(71) Applicant: Amazon Technologies, Inc., Seattle, WA (US)

(72) Inventors: Deepak Aggarwal, Hyderabad (IN); Monishkumar Gajendran, Vellore (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/216,691

(22) Filed: Dec. 11, 2018

(51) Int. Cl.
*G06F 9/50* (2006.01)

(52) U.S. Cl.
CPC .......... *G06F 9/5055* (2013.01); *G06F 9/5038* (2013.01); *G06F 9/5072* (2013.01); *G06F 2209/5013* (2013.01); *G06F 2209/5021* (2013.01); *G06F 2209/503* (2013.01); *G06F 2209/504* (2013.01)

(58) Field of Classification Search
CPC .... G06F 9/5055; G06F 9/5038; G06F 9/5072; G06F 2209/5013; G06F 2209/5021; G06F 2209/503; G06F 2209/504
See application file for complete search history.

(56) References Cited

U.S. PATENT DOCUMENTS

| | | | | |
|---|---|---|---|---|
| 8,392,558 B1 * | 3/2013 | Ahuja | .................... | G06F 9/505 709/227 |
| 8,429,282 B1 * | 4/2013 | Ahuja | ................ | H04L 12/6418 709/224 |
| 8,667,056 B1 * | 3/2014 | Proulx | .................. | H04L 47/808 709/225 |
| 9,195,805 B1 * | 11/2015 | Brandwine | ......... | H04L 63/1458 |
| 9,473,413 B1 * | 10/2016 | Cao | ......................... | H04L 47/24 |
| 9,503,353 B1 * | 11/2016 | Gemignani, Jr. | ....... | H04L 47/83 |
| 9,703,602 B1 * | 7/2017 | Kusters | ................... | G06F 3/061 |
| 9,830,175 B1 * | 11/2017 | Wagner | ................. | G06F 9/5027 |
| 9,959,145 B1 * | 5/2018 | Gershon | ............... | G06F 9/5083 |
| 10,148,588 B1 * | 12/2018 | Sledz | ....................... | H04L 43/18 |
| 10,187,410 B2 * | 1/2019 | Greenberg | ............ | H04L 63/145 |
| 10,334,013 B2 * | 6/2019 | Brown | .................... | H04L 67/02 |
| 10,439,900 B2 * | 10/2019 | Wright | ................... | G06F 3/067 |

(Continued)

FOREIGN PATENT DOCUMENTS

CN 108900379 A * 11/2018 ......... H04L 43/0817

OTHER PUBLICATIONS

Cormode, G., et al., "Exponentially Decayed Aggregates on Data Streams," 2008 IEEE 24th International Conference on Data Engineering, Cancun, Mexico, Apr. 7-12, 2008, pp. 1379-1381.

*Primary Examiner* — Oleg Survillo
*Assistant Examiner* — Abdelbasst Talioua
(74) *Attorney, Agent, or Firm* — Davis Wright Tremaine LLP

(57) ABSTRACT

A computing system may detect that a service, which receives a plurality of task requests associated with clients or profiles, is under duress based on performance information associated with the service. The computing system, responsive to detecting that the service is under duress, may successively, until the service is detected to not be under duress, select a profile based on a respective volume of requests associated with the profile, apply a task request limit to the profile, and detect whether the service is still under duress.

20 Claims, 10 Drawing Sheets

(56) References Cited

U.S. PATENT DOCUMENTS

| | | | |
|---|---|---|---|
| 10,548,050 B2* | 1/2020 | Melander | H04M 15/8016 |
| 10,963,330 B2* | 3/2021 | Ungar | G06F 11/0778 |
| 2007/0118653 A1* | 5/2007 | Bindal | H04L 47/10 |
| | | | 709/226 |
| 2009/0307352 A1* | 12/2009 | Felton | H04L 69/40 |
| | | | 709/226 |
| 2010/0192201 A1* | 7/2010 | Shimoni | G06F 21/55 |
| | | | 726/3 |
| 2010/0203916 A1* | 8/2010 | Tiwari | H04B 7/0871 |
| | | | 455/69 |
| 2010/0274893 A1* | 10/2010 | Abdelal | H04L 47/263 |
| | | | 709/224 |
| 2013/0111031 A1* | 5/2013 | Hoffmann | G06F 9/505 |
| | | | 709/226 |
| 2014/0041055 A1* | 2/2014 | Shaffer | G06F 21/604 |
| | | | 726/28 |
| 2015/0156123 A1* | 6/2015 | Xiao | H04L 47/12 |
| | | | 370/230 |
| 2015/0263978 A1* | 9/2015 | Olson | G06F 3/067 |
| | | | 709/226 |
| 2016/0021136 A1* | 1/2016 | McGloin | H04L 63/1458 |
| | | | 726/23 |
| 2016/0080484 A1* | 3/2016 | Earl | H04L 67/1008 |
| | | | 709/226 |
| 2016/0088521 A1* | 3/2016 | Ho | H04W 40/12 |
| | | | 455/453 |
| 2016/0182612 A1* | 6/2016 | Bank | H04L 67/02 |
| | | | 709/204 |
| 2016/0316028 A1* | 10/2016 | Sengupta | H04L 69/40 |
| 2017/0103366 A1* | 4/2017 | Gupta | G06Q 10/105 |
| 2017/0180254 A1* | 6/2017 | Certain | G06F 9/00 |
| 2018/0081832 A1* | 3/2018 | Longo | H04L 67/10 |
| 2018/0084006 A1* | 3/2018 | Kwan | H04L 63/0227 |
| 2018/0097707 A1* | 4/2018 | Wright | H04L 67/1097 |
| 2018/0227238 A1* | 8/2018 | Buban | H04L 67/01 |
| 2019/0109922 A1* | 4/2019 | Ravichandran | G06F 9/5083 |
| 2019/0243557 A1* | 8/2019 | Joshi | G06F 3/0647 |
| 2019/0386884 A1* | 12/2019 | Qi | H04L 67/1001 |
| 2020/0073718 A1* | 3/2020 | Singh | G06F 9/5027 |
| 2020/0097202 A1* | 3/2020 | Ou | G06F 3/0622 |
| 2020/0153919 A1* | 5/2020 | Xiong | H04L 63/1458 |

* cited by examiner

MINIMAL CONFIGURATION AND PRIORITY-BASED FRUGAL THROTTLING SOLUTION

BACKGROUND

Web-based or network accessible services, such as services that provide computing, database, storage, and other services in a multi-tenant environment, can experience periods of higher than normal volume of requests for the service to perform various tasks. During these periods, current service providers may throttle users or clients (internal or external to the service provider) based on usage quotas to attempt to manage the increased traffic and help to continue to maintain levels of service provided to various clients. These types of service models enable clients to reserve excess capacity to ensure that they have enough bandwidth for periods of excess loading or traffic, at the expense of system efficiency. These throttling mechanisms can require maintaining of potentially large amounts of information in keeping track of and storing user quotas.

BRIEF DESCRIPTION OF THE DRAWINGS

Various techniques will be described with reference to the drawings, in which.

DETAILED DESCRIPTION

Figure 1:
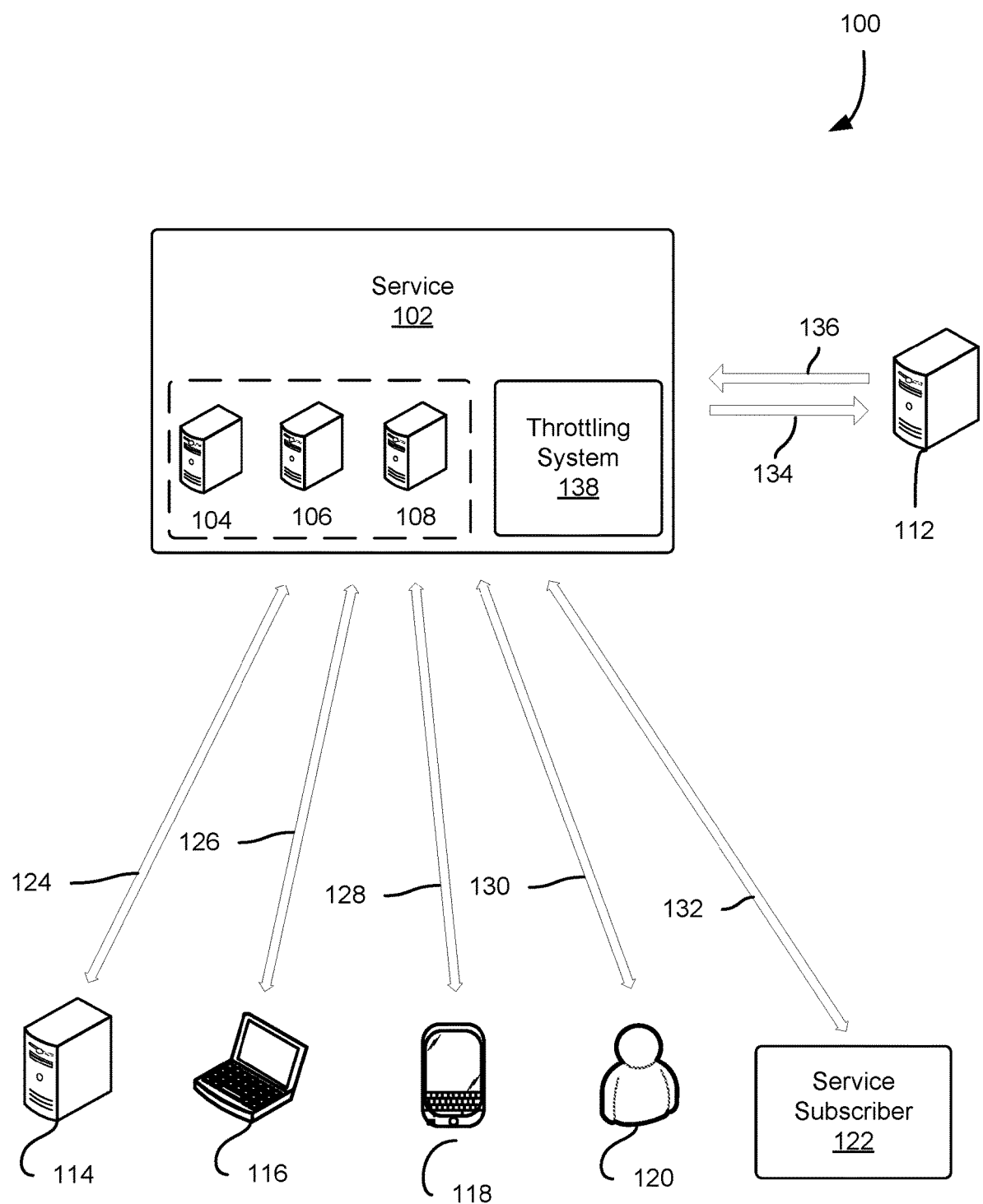
FIG. 1 shows an illustrative example of an environment in which various embodiments may be practiced.

The current document describes a service throttling system that improves performance and capacity of a service by selectively throttling clients based on traffic when the service is under duress. The service throttling system or simply throttling system, may first determine that the service is under duress. The throttling system may then determine a client or profile associated with the largest volume of task requests (e.g., measured in tasks per second, or TPS or other similar metric), and throttle the grant rate of those requests for that client. The throttling system may then detect or determine if the system is still under duress, at which point, the throttling system may continue to select and throttle the highest volume client until the system is no longer under duress. In some cases, clients or profiles may be associated or grouped into priority levels. The throttling service may start with a lowest priority, and throttle the highest request volume clients in the lowest priority group. If throttling all of the clients in the lowest priority group does not take the service out of duress, the throttling service may then selectively throttle clients in a second lowest priority group, and so on, until the system is no longer under duress. The described system may isolate clients or tenants to better optimize throttling specific clients to reduce system load. The described system may further isolate and throttle specific operations of specific clients by utilizing operation identifiers, to improve the precision of the throttling operations, and rapidly reduce load on the service to take it out of a duress state.

In some cases, the throttling system may determine or detect that the service is under duress, such as based on load or CPU utilization of one or more host machines providing the service. In some cases, the throttling system may determine that the service is under duress based additionally or alternatively on one or more conditions of a dependent service, such as a storage or database service utilized in the conjunction with the main service to perform one or more client requested tasks. In some cases, the conditions may include whether the dependent service is throttling the main service, or a failure rate of requests to the dependent service. The throttling system may obtain or detect this information via a data collector that interfaces with the service and/or dependent service or services. The policies or thresholds at which the system is determined to be under duress may be configurable.

The throttling service may use various techniques to determine a request rate of clients, for example, in order to determine or select a highest volume client or other client for throttling. These techniques may include probabilistic estimation of the volume of data associated with requests for clients, using a sliding window rate calculator, or other techniques. Once a client is selected for throttling, a throttle rate may then be applied to that client. The throttle rate may be selected or determined based on a number of different ways, such as using one or more additive-increase/multiplicative-decrease (AIMD)-based algorithms. In some aspects, the clients selected for throttling may be selected based on another measure other than highest volume or number of requests, such as based on priority, amount above present thresholds, etc. In this way, the described system is not limited to picking only the highest volume requestor, but can be configured to balance speed, number of clients throttled, and other considerations in responding to service duress.

The throttling system may lift throttling limits placed on clients when the system is no longer under duress. This may be applied in a number of different ways, including increasing a request grant rate incrementally, linearly, proportionally, exponentially, or via a number of different ways. In some aspects, the increasing of request grant rates can be applied to clients in a reverse order of the throttling or via a number of other different schemes. In some cases, rate limits may be increased at a slower rate than they were initially throttled, to help guard against placing the system back under duress. In some cases, a threshold utilization, below the duress threshold, may be set for increasing request limits, so as to prevent swinging the service back into duress.

By only limiting requests from client during duress, the described throttle system can accommodate and provide for enhanced service to clients, for example, when the system is not under heavy load, but one or a number of clients have high bursty traffic. By not placing a maximum on the request rate for a given client, but only limiting requests rate when the system is under duress, high isolated traffic bursts can still be serviced.

The throttling service may include a black list feature, whereby clients known to have high request rates may be blacklisted, and their request rates limited independent of whether the service is under duress. The throttling system may also include a kill switch system to immediately disable the throttling system to react to abrupt changes to traffic on the service, provide better fault tolerance, and for various other reasons.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The described throttling system does not need to configure or store client quota information for all clients, and thus can reduce the amount of data stored to manage the throttling system and decrease operational load. In addition, by only throttling clients when the system is under duress, and increasing request limits when the system is not under duress, the service can provide increased to full capacity utilization. Without a reliance on quotas, clients do not have the option to reserve excess capacity that may only be used infrequently, such as during times of increased traffic or load, thus increasing utilization of the service. This also makes the throttling system more secure since it does not have to maintain the quota configurations for each client. The described system can provide low latency at a large scale, such as in some cases, adding approximately only 10 micro seconds per request for a throttle decision. By monitoring and reacting to downstream or dependent services, the described system can provide brown-out protection based on dependent resource/service behavior.

The described system can also optimize utilization of the service by tracking and making decision based on system's dependent resources usage. In this way, the described throttling system may help to protect service resources, such as the host machine CPUs and memory resources. In addition, by being reactive to downstream or dependent services, all benefits provided by the dependent or downstream services may be passed to clients. The described system may provide for storage and granular tasks per second (TPS) calculations at each client level, to provide a flexible and scalable throttling solution. In some cases, the described system may reduce operational cost by keeping minimal number of machines in use regardless of the fluctuating behavior of client requesting rates.

The described techniques may provide a number of benefits over global throttling solutions. Those benefits include less latency in making throttling decisions and not having to sync anomalies or changes to global polices across an entire service or fleet of host machines. In some aspects, the described local throttling solution may not provide the most accurate response to heavy traffic, such as global solution would. However, because the described local throttling solution can be implemented more efficiently, and provides complete tenant isolation, the loss of accuracy is less important.

FIG. 1 shows an illustrative example of an environment in which various embodiments may be practiced. Environment 100 includes a service 102 that performs any of a number of different tasks based on requests from clients or profiles, 114, 116, 118, 120, or 122, received over one or more networks. In some aspects, the service 102 may be a token generation service, a service that provides other cryptographic functions, or various other functions. The service 102 may be a distributed computing service, a multi-tenant service, or other type of service, and may include one or more computer systems or host machines 104, 106, 108, such as remote computing systems, virtual computing systems, or combinations thereof, that may perform or assist in performing tasks requested by clients or profiles 114, 116, 118, 120, or 122. Throttling system 138 may include one or more servers or computing systems that have executable code to perform throttling operations, as described herein. In some aspects, service 102 may be provided by one or more application servers 1008 and/or data store 1010 as described below in reference to FIG. 10.

Clients or profiles 114, 116, 118, 120, or 122 may include one or more aspects of clients 1002, described below in reference to FIG. 10. Service 102 may also communicate with other services 112, which may be downstream or dependent services. As used herein, client may refer to an internal customer of (e.g., system that uses) service 102, one or more computing system, including remote computing systems, virtualized computing systems, and the like, an external customer of service 102, a service subscriber 122, and number of other entities. Services 112 may include one or more storage services, one or more database services, or other services provided in a multi-tenant service infrastructure. Service(s) 112 may communicate with service 102 over downstream 134 and upstream 136 channels.

Service 102 may also include a throttling system 138. As illustrated, throttling system 138 is part of service 102. Throttling system 138 may detect or obtain system performance information, for example, of service 102 and/or services 112. The system performance information may include requested rate and grant rate for a number of clients, such as a selected subset of the clients that have a history or a large volume of requests. The system performance information may also include load on service 102, measured, for example, in processor utilization, or in some cases, in memory utilization. The system performance information may also include load on dependent service(s) 112, such as information of the extent to which dependent service(s) 112 is throttling requests from service 102. This information may specify a rate at which requests received over channel 134 by service 112 are throttled and granted over channel 136. This information may also be in the form of request failure rate, such as number of requests denied in a given time period. In some aspects, some or all of the information utilized by the throttling system 138 may be stored in data store 1010, as described below in reference to FIG. 10.

Based on the system performance information, the throttling service 138 may determine if the service 102 is under duress. The condition or conditions which satisfy duress may be configured, for example, via client input, set at default rates, etc. These conditions may take the form of thresholds, policies, rules, and the like.

In some embodiments, throttling system 138 may be a standalone system or service, and may communication with service 102 over one or more networks. In these examples, throttling system 138 may receive system performance information from service 102 and/or dependent service(s) 112, and determine whether the performance information meets one or more thresholds or other conditions for duress. In other cases, the throttling service 138 may simply receive an indication that the service 102 is under duress.

In either example of throttling service 138, described above, upon detecting or determining that the service 102 is under duress, throttling service 138 may select a certain client or clients of clients 114, 116, 118, 120, or 122 for which to throttle or reduce the request grant rate over connections or channels 124, 126, 128, 130, or 132. In some cases, the throttle system 138 may select one or more clients 114, 116, 118, 120, or 122 with a large volume of requests to the service 102 for throttling. In some cases, the throttling system 138 may select a client with a highest volume, and throttle the request grant rate for that client. In this example, selecting one or more clients with a large volume may include selecting clients having the n highest volumes, either out of all clients or a subset thereof. The throttling system 138 may then check to see if the service 102 is still in a state of duress. If the service is still in a state of duress, the throttle system 138 may then select a second highest volume client, and subsequent highest volume clients of clients 114, 116, 118, 120, or 122 for throttling until the service 102 is no longer in a state of duress. The throttling system may be designed and implemented so as to reduce throttle decision latency, reduce network usage, reduce CPU and memory resource usage, and provide for fast recovery times to take the service 102 out of a state of duress.

Figure 2:
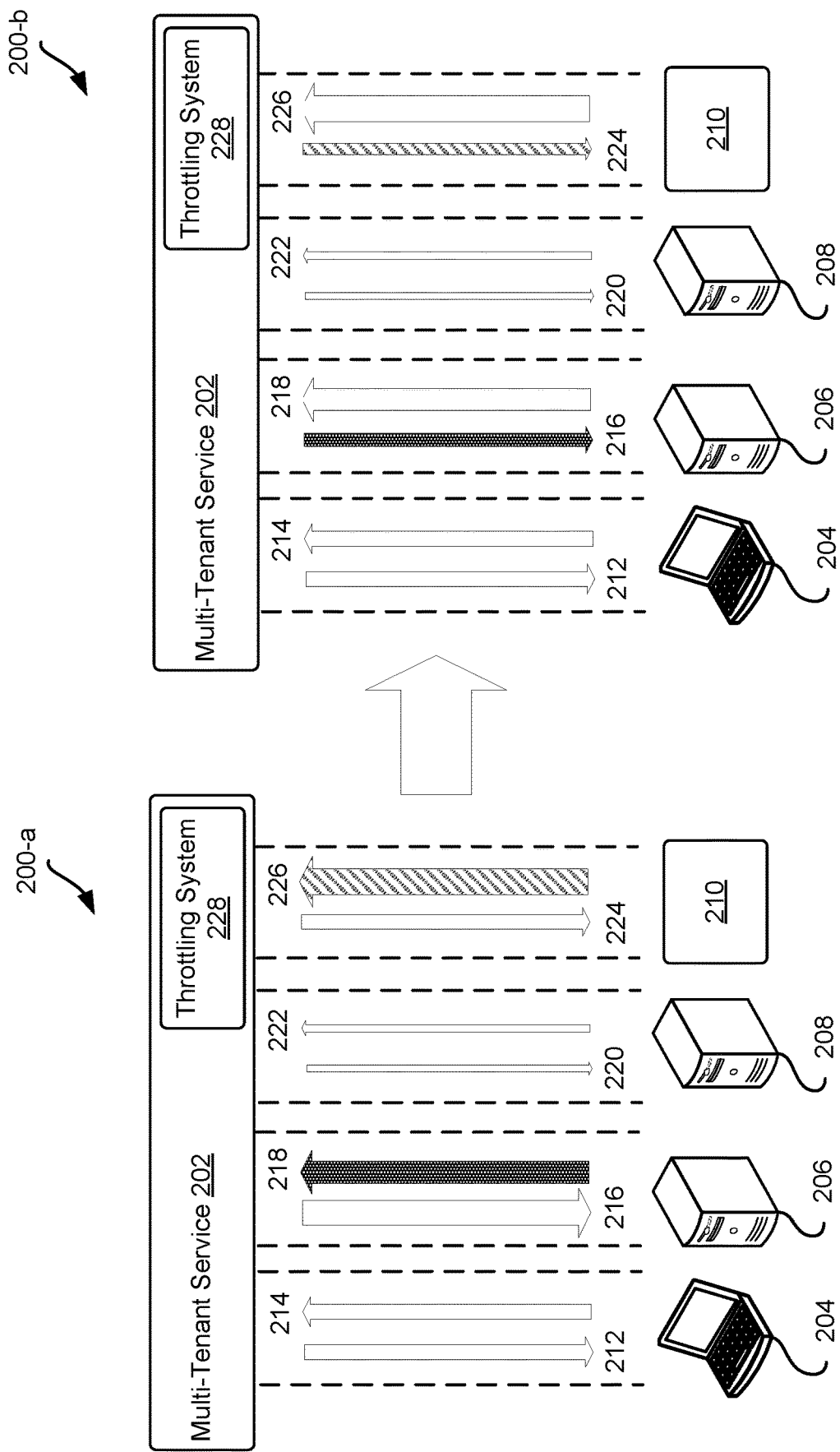
FIG. 2 shows an illustrative example of a service for throttling specific users, clients, or profiles.

FIG. 2 shows an illustrative example of a service 202 throttling or limiting granted request volume for specific users, clients, or profiles 204, 206, 208, and 210, for example, when the service 202 is in a state of duress. FIG. 2 illustrates two different states or points in time 200-a and 200-b. State 200-a may represent a before state, and state 200-b may represent a state after throttling has been applied to one or more of clients 204, 206, 208, and 210.

In the example of FIG. 2, service 202 and throttling system 228 may be an example of service 102 and throttling system 138 described above in reference to FIG. 1.

Each client 204, 206, 208, and 210 may request tasks to be performed by the service 202 via task requests 214, 218, 222, 226, indicated by arrows respectively, over one or more network connections. Service 202 may grant some or all of those requests, indicated by arrows 212, 216, 220, 224. The width of these task request flows may represent an amount of data associated with the task requests, an amount of requests, or some other metric used to quantify the requests. As illustrated, client 204 may submit a moderate amount of task requests 214 and the service 202 may grant all or nearly all of these requests 212. In state 200-a, client 206 may submit a larger volume of requests 218 and have all or most of those requests granted by service 216. Client 208 may submit a small number of requests 222 and have all or most of all of those requests granted 220. Client 210 may submit a large number of requests 226 and only have a portion of those requests granted 224.

Upon determining or detecting that service 202 is under duress, throttling service 228 may select one or more clients to which to apply a throttle or request limit, in order to bring the service 202 out of a state of duress. The service 202 may select clients of clients 204, 206, 208, 210 for throttling based on a volume of requests associated with each client or a subset thereof. As illustrated, using one or more tools, as will be described in greater detail below, throttling service 228 may determine that client 210 has the highest volume of requests, and client 206 has the second highest volume of requests. The throttling service 228 may select client 210 and apply a limit to the requests that the service 202 will grant, as illustrated by smaller requests granted 224 in state 200-b. In one example, the throttling system 228, or service 202, or a combination thereof, may determine that the service 202 is still in a state of duress. In response to that determination, throttling system 228 may then limit the requests granted to a second highest volume client, client 206.

In some cases, the throttling system 228 may identify a highest request volume client after every throttle decision is applied. In some cases, the same client, such a client 210, may continue to be the highest volume client for multiple cycles (e.g., after multiple, successively smaller limits are placed upon requests for that client). In this scenario, the throttling service may continue to reduce the request limit of client 210 until the request rate 226 of client 210 is no longer the highest rate of all clients 204, 206, 208, 210, or a subset thereof. At that point, throttling system 228 may select the highest request rate client, which may be client 206, having request rate 218 and begin to throttle that client. The throttling service 228 may continue to throttle the client having highest volume request until the system is no longer in a state of duress. In this way, the throttling service 228 may attempt to distribute the throttling effect more evenly throughout the clients with the highest request volume.

In some aspects, one limited request rate may be determined and applied to all clients, selectively, as determining by throttling system 228. In this way, the amount of data stored to implement the throttling service 228 may be drastically reduced. The limit request may be determined based on historical request information, or based on other information.

In yet some embodiments, the throttling service 228 may track and maintain a list of the clients having a request rate above a threshold. When the service 202 is in a state of duress, the throttling system 228 may throttle these subset of clients first, such as in descending order according to highest request rate, or may apply the same request rate limit to each at once or successively. In this way, the throttling service 228 may attempt to reduce the amount of time it takes to bring the service 202 out of a state of duress and/or reduce the amount of overhead needed to determine the client with the highest request rate multiple times.

In some examples, throttling system 228 may group different clients into priority levels, such as based on volume of requests, preferred client status, or other metrics. The throttling system 228, upon detecting that the service 202 is under duress, may first throttle clients in a lowest priority, and continue to move up the levels of priority, for lowest to highest, until the service 202 is no longer under duress. The throttling system 228 may implement any or a combination of the above described schemes for bring the service 202 out of duress, in each priority level.

Upon applying various throttling schemes, as described above, the service 202 may move out of a duress state and into a normal operating state. In this case, the throttling service 228 may begin to increase the request grant rate 212, 216, 220, 224 of select clients 204, 206, 208, 210 in order to maximize service utilization and provide clients with a higher level of service. In some aspects, increasing the request grant rate may be done in the reverse order of applying throttling, or may be done in another order, such as proportionally to the clients that were throttled. In some examples, the request grant rate may be increased at slower pace (e.g., incrementally) than throttling was originally applied, for example, to help ensure that the service 202 is not pushed back into a state of duress.

In some aspects, client requests may be identified or associated with a client identifier and a description or identification of an operation to which they pertain, such as an operation ID. In some cases, throttling may be applied to one or more specific operations, identified by operation ID, of one or more clients 204, 206, 208, 210. The operation or group of operations may be selected by type, or other characteristic, to more efficiently reduce load on the service 202. For example, operations may be selected based on an amount of data or other resourced required to respond to the request, either specific to a client or across a number of clients, to help efficiently reduce load on the service 202. In some cases, service 202 may be a virtualized service, such that multiple instances of the same or similar server are implemented on different host machines. The client identifier may identify the service 202 broadly, such that multiple instances may be included in the same client identifier, to reflect the fact that the client may be using multiple instances of the same service.

Figure 3:
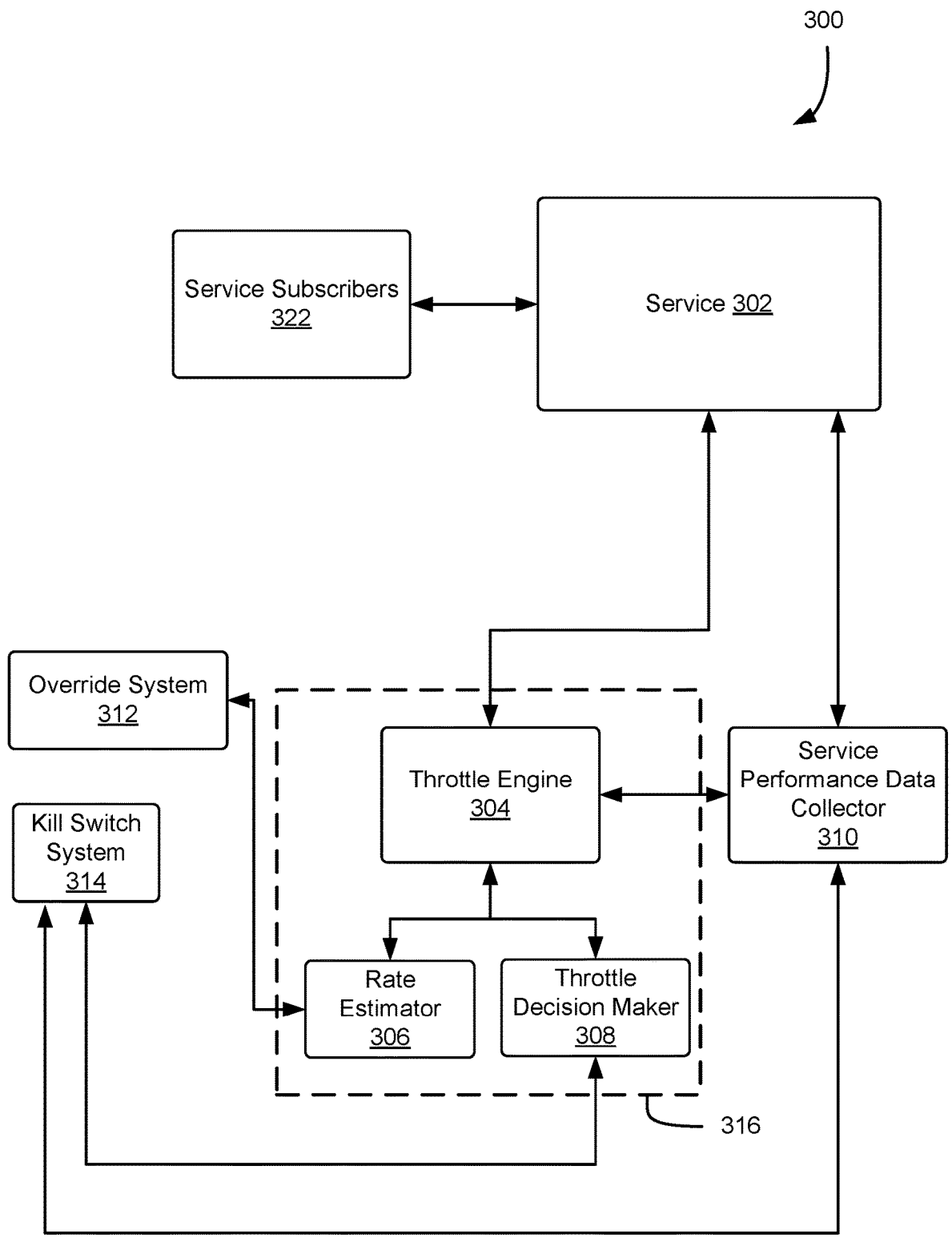
FIG. 3 shows an illustrative example of a system for selectively throttling clients of a service.

FIG. 3 shows an illustrative example of a system 300 for selectively throttling clients of a service. System 300 includes a service 302, which may be an example of services 102 or 202 described above in reference to FIGS. 1 and 2. Service subscribers or clients 322 interface with the service 302 and send a variety of task requests to be performed by the service 302. The service 302 communicates with a throttling system 316 to configure and implement rate limits on clients or subscribers 322. It should be appreciated that while throttling system 316 is described as being separate form service 302, it may be implemented at least in part by service 302. The distributed computing service 302 and the throttling system 316 communicate with a service performance data collector 310 to obtain data to make throttling decisions. In some aspects, system 300 may also include an override system 312, which communicates with the throttle engine 304 and/or the subscriber 322, and a kill switch system 314, which communicates with the throttle decision maker 308 and/or the subscriber 322.

The throttling system 316, including throttle engine 304, rate estimator 306, and throttle decision maker 308 may include or be implemented by one or more servers or computing systems that have executable code to perform throttling operations. Service performance data collector 310, override system 312, and kill switch system 314 may similarly include or be implemented by one or more servers or computing systems that have executable code to perform their respective operations, as described in more detail below.

The subscriber 322 may communicate directly with the throttling system 316 or indirectly though the service 302. The subscriber 322 may configure certain request or task rates to be implemented and enforced by the service 302 and/or throttle system 316. In some cases, the subscriber 322 may provide level of service requirements or other configuration information to the service 302, and the service 302 may select and implement certain rates with the throttling system 322. In other cases, the service 302 may assign various rates and other parameters to the subscriber, for example, by default. It should be noted, however, that the described throttling service may implement various schemes for bringing the service out of a state of duress without having to maintain request rate quotas for every client of the service.

The throttle system 316 obtains data collected from service 302 and any dependent services via service performance data collector 310, to be used in determining and applying throttling limits to clients or subscribers 322. The throttling system 316 may include a throttle engine 304, a rate estimator 306, and a throttle decision maker 308, which will each be described in turn below.

The service performance data collector 310 acquires data from the service 302 and provides at least some of the data to the throttle system 316. In some cases, the data collector 310 takes a predefined configuration map between each rate metric and its respective provider. The data collector 310 provides an interface to obtain data from the service 302 and other dependent services (not shown). More specifically, the data collector 310 obtains request information associated with different clients 322 from the service 302 and provides that information to the rate estimator 306. The data collector 310 also acquires utilization information from the service 302 and, in some cases, throttle and/or failure information from any dependent services, and provides that information to the throttle decision maker 308. In some cases, the performance information from the service 302 may include utilization information specific to various servers or host machines that perform various tasks in response to client requests.

The throttle engine 304 evaluates the state of the service 302 using a duress state indicator provided by the throttle decision maker 308 and rate estimates provided by the rate estimator 306. In some aspects, one or more of the throttle decision maker 308 and the rate estimator 306 may be asynchronous components that wake up or activate at one or more configurable intervals (e.g., k seconds). In other examples, throttle decision maker 308 and the rate estimator 306 may wake up when dependent service throttling rates and/or subscriber request rates reach certain thresholds.

The throttle decision maker 308 obtains service performance data from the data collector 310 and, using that data, evaluates the service 302 to determine if it meets one or more thresholds for being in a duress state. The throttle decision maker 308 applies or compares the obtained information to a set of rules or polices that define what constitutes duress, such as one or more thresholds. The one or more thresholds may be configurable, including based on time of day, load on the service, time of year, and so on. In some cases, the duress threshold or thresholds may be service-wide, or may specific to one or more host machines of service 302, such as hosts 104, 106, 108 described above in reference to FIG. 1, assigned to or providing task resolution to subscribers 322. In other aspects, the threshold(s) may include a number or percentage of total host machines exceeding one or more thresholds. In one example, a service 302 threshold may be equal to or greater than 70% CPU load on one or more host machines of the service 302. The duress threshold may also include one or more dependent service thresholds, such as a specified throttling rate failure in a given time period (e.g., greater than 0 failures in the last 15 seconds). In some implementations, both type of thresholds may be utilized such that if one threshold is exceeded, the throttle decision maker 308 will determine that the service 302 is under duress. Once the data has been applied to the rules/threshold(s), the throttle decision maker may communicate a duress/no duress indicator to the throttle engine 304.

The rate estimator 306 receives service performance data from the data collector 310 and determines requested and granted rates for all or a subset of subscribers 322 of service 302. In some cases, a subset of subscribers 322 may be selected, either by the rate estimator 306, or other processes or components of the throttle system 316, for example, based on historical data indicating the subscribers 322 associated with the top or highest request volumes. In some cases, the rate estimator 306 may estimate request rates for one or more dependent services as well.

In some examples, the rate estimator 306 may estimate a request rate for incoming requests and/or a request grant rate for subscribes 322 using a space-saving algorithm or variant thereof (referred to herein as a heavy hitters algorithm), as described in Cormode, Graham et al. "Exponentially Decayed Aggregates on Data Streams." 2008 *IEEE 24th International Conference on Data Engineering* (2008): 1379-1381, the contents of which are incorporated by reference in their entirety as if fully set forth herein. This algorithm can be used to identify and track large volume request subscribers or heavy hitters in a data stream. For example, a data stream may be represented by an (unbounded) sequence of tuples:

$$e\_i = x\_i, w\_i, t\_i$$

where x_i is the identifier of the item, w_i is a non-negative weight associated with the item, and t_i is the timestamp at which the item arrived. The rate of an item x in the stream at time/may be expressed as an exponentially decayed measurement of x's weight per unit time:

$$r(x) = \Sigma[(1/2)^{((t-t_i)/halfLife)} * w_i]\Sigma[(1/2)^{((t-t_i)/halfLife)}$$

over all i, such that x_i=x.

The rate of a system at time/may be expressed as R, which is the sum of all the decayed rates of all the items. The epsilon-approximate exponentially decayed large volume request subscribers problem is to find a set of items S such that:

$$\text{Sum}(x \backslash \text{in } S)[r(x)] >= (1\text{-epsilon})*R, \text{omitting no } x \text{ with}$$
$$r(x) >= \text{epsilon}*R$$

In one example, Table 1 below represents a stream of packets having an item ID of a subscriber IP address, where the weight of an item is the size of that packet. In this example, the error tolerance epsilon is 0.001, and the total rate of packet flow is 10 Gbps. The 0.001-approximate large volume request subscribers problem would be to find in the stream all subscriber IP addresses whose current (smoothed) rate is greater than 10 Mbps, or 0.001 times the total rate of the system. This example uses O (1/epsilon) space, where reportNextItem ( ) takes O(log (1/epsilon)) time, and find-Approx HeacyHitters ( ) takes O(1/epsilon) time.

In some examples, the rate estimator 306 may estimate a dependent service (e.g., dependent service 112) throttling rate using a sliding window rate calculator or variant thereof. For example, the rate estimator 306 may calculate the actual average throttle rate over a sliding window of time, such as 15 seconds. The accuracy of the estimate is based on the samples selected from the sliding window and the size of the window. In this way, the sliding window estimate approach is not probabilistic, as the "space-saving" technique described above.

It should be appreciated, that in some embodiments, the space-saving technique or the sliding window technique may be used to determine the request rate, the grant, and/or the throttle rate of applicable subscribes and dependent services.

In some aspects, the rate estimator 306 may select a subset of subscribers 322 most likely to be throttled in case of service 302 duress, based on the requested and granted estimated rates, based on the service 302 duress state or threshold(s). In one example, a different subset of subscribers 322 may be selected depending on the extent of duress the service 302 or dependent services are under. Using the space saving algorithm and/or the sliding window calculator, the rate estimator 306 may maintain throttle state (either throttled or not) for each subscriber 322 selected for throttling or in the selected subset.

The rate estimator 306 may communicate the subset of large volume request subscribers to the throttle engine 304, whereby the throttle engine 304 may select one or more of the subset for throttling, and communicate that selection to the rate estimator 306. In other cases, the rate estimator 306 may select one or more subscribers for throttling. In either case, the rate estimator 306 may then determine a percentage of the current request rate or request rate limit to which to apply to the selected one or more subscribers 322. In some cases, an additive-increase/multiplicative-decrease (AIMD) algorithm may be used to set a request limit on one or more subscribers. The AIMD algorithm combines linear growth of a congestion window with an exponential reduction when a

TABLE 1

| Scenario | 10x Spike of Requests at T-15 and T-14th Second | 10x Spike of requests at T-7 and T-8th Second | 10x Spike of requests at T-1 and T-2th Second | Equally Distributed number of requests |
|---|---|---|---|---|
| 1 s | 2405987 | 300000 | 300000 | 2263162 |
| 2 s | 2909293 | 300000 | 300000 | 2845003 |
| 3 s | 300000 | 300000 | 300000 | 3148769 |
| 4 s | 300000 | 300000 | 300000 | 3232007 |
| 5 s | 300000 | 300000 | 300000 | 3117307 |
| 6 s | 300000 | 300000 | 300000 | 3036367 |
| 7 s | 300000 | 3000707 | 300000 | 3109467 |
| 8 s | 300000 | 2962871 | 300000 | 3103199 |
| 9 s | 300000 | 300000 | 300000 | 3195290 |
| 10 s | 300000 | 300000 | 300000 | 3084657 |
| 11 s | 300000 | 300000 | 300000 | 3104285 |
| 12 s | 300000 | 300000 | 300000 | 3121894 |
| 13 s | 300000 | 300000 | 300000 | 3076299 |
| 14 s | 300000 | 300000 | 3085014 | 3155149 |
| 15 s | 300000 | 300000 | 2971002 | 3111666 |
| Total Requests | 9215280 | 9863578 | 9956016 | 45704521 |
| Total Requests/15(AVG) | 614352 | 657571.8667 | 663734.4 | 3046968.067 |
| Heavy hitters rate | 288733.75 | 426809.949 | 1435833.685 | 3071286.049 |
| halflife | 2500 | 2500 | 2500 | 2500 |
| Total Time | 15000 | 15000 | 15000 | 15000 |
| Conclusion | The spike Doesn't affect the Rate | The spike may or may not affect the Rate | The spike affects the rate | Gives the near average value | congestion takes place. In other examples other algorithms may be used to set request limits for subscribers, such as Multiplicative Increase Multiplicative Decrease (MIMD), where the growth back to normal is exponential increase.

In some aspects, the rate estimator 306 may set quotes or request limits for one or more of the subset of subscribers 322 using the AIMD algorithm, and communicate those quotas to the throttle engine 304. The throttle engine 304 may then determine whether the service 302 is in a state of duress, as will be described in greater detail below in reference to FIG. 6. Upon determining that the service 302 is in a state of duress, the throttle engine 304 may apply one or more of the quotas to the subscriber requests, via service 302. The throttling engine 304 may select which subscribers to which to apply the quotas or request limits based on volume of requests of each client or a subset thereof, based on highest request volume, by subset, such as historical highest volume which are described in greater detail in reference to FIGS. 4, 5, 7, and 8 below.

In a similar way, the throttle system 316 may increase request limits for subscribers based on a determination that the service 302 is no longer under duress. An example process of rate increase will be described in reference to FIG. 9 below.

In some aspects, system 300 may include a kill switch system 314. The kill switch system 314 may receive service performance information from the data collector 310 and may communicate instructions to the throttle decision maker 308 for disabling the throttle system 316. In some cases, the kill switch system 314 may be activated in response to changing network or traffic conditions, for example, based on requests from subscribers 322. The kill switch system 314 may also provide for increased fault tolerance in the case of throttle system malfunction.

In some aspects, system 300 may include an override system 312, which communicates rate overrides with rate estimator 306. In some examples, override system 312 may configure certain overrides for rates applied to different clients 322, such as request limits to be applied regardless of other throttle decisions. This may be particularly useful when one or more clients 322 have a history of high bursty traffic, such that it is beneficial to apply rate limits to these clients 322 to improve overall performance of the service. In other cases, the override system 312 may configure and indicate unlimited request rates for certain clients 322.

Figure 4:
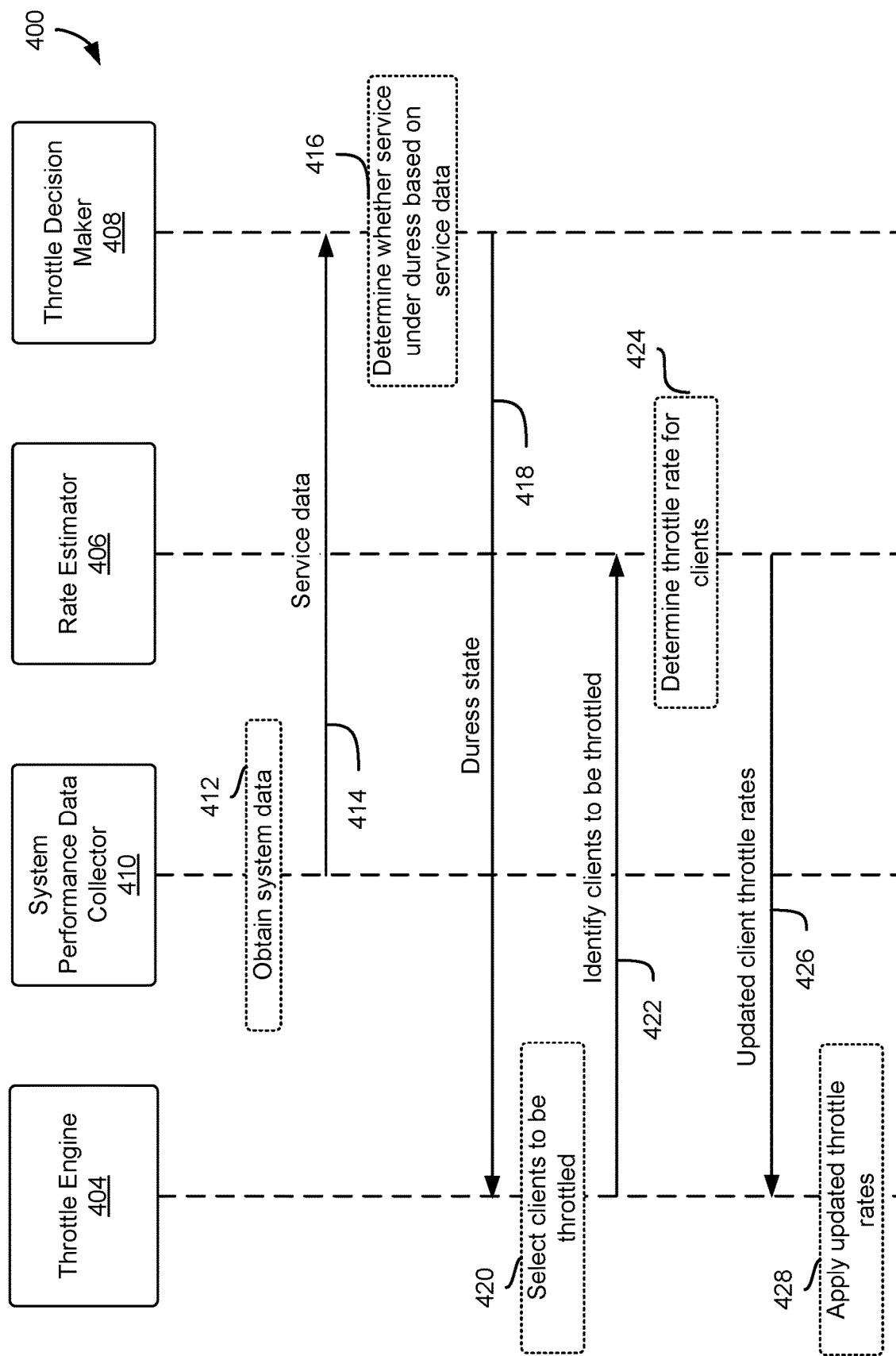
FIG. 4 shows an illustrative example of interactions of components of a throttling system for selectively throttling clients of a service.

FIG. 4 shows an illustrative example of interactions 400 of components of a throttling system for selectively throttling clients of a service. Interactions 400 are between a throttle engine 404, a system performance data collector 410, a rate estimator 406, and a throttle decision maker 408. The throttle engine 404, system performance data collector 410, rate estimator 406, and throttle decision maker 408 may be examples of the throttle engine 304, system performance data collector 310, rate estimator 306, and throttle decision maker 308 described above in reference to FIG. 3.

Process 400 may begin with system performance data collector 410 obtaining service data at operation 412, such as utilization information from the service and/or throttling rates from any dependent services. The data collector 410 may communicate some or all of the service data to the throttle decision maker 408, at operation 414. The throttle decision maker 408 my then, based on the service data, determine whether the system is under duress, at operation 416. Operation 416 may include applying the service data to one or more thresholds, as will be described in greater detail below in reference to FIG. 6. Upon determining whether the service is under duress, the throttle decision maker 408 sends the duress state, at operation 418, to the throttle engine 404. In some cases, duress state may be communicated to the throttle engine 404 upon a change in state, either from no duress to duress, or from duress to no duress. In either case, the throttle engine 404, using the duress state information, may determine or select which clients to throttle, or alternatively which clients to increase request rates for (in the case of a no duress condition), at operation 420.

The throttling engine 404 may communicate the clients selected for throttling or request rate increase to the rate estimator 406, at operation 422. The rate estimator 406, utilizing AIMD or other algorithms described herein, may then determine throttle rates for some or all of the selected clients, at operation 424. Alternatively, the rate estimator 406 may increase the rate limit for one or a number of clients additively or incrementally, when the service is not in a duress state.

The rate estimator 406 may then send the updated client throttle rates or quotas, at operation 426, to the throttle engine 404. The throttle engine 404 may then apply the throttle rates to select clients at operation 428, either directly or through the service itself.

Figure 5:
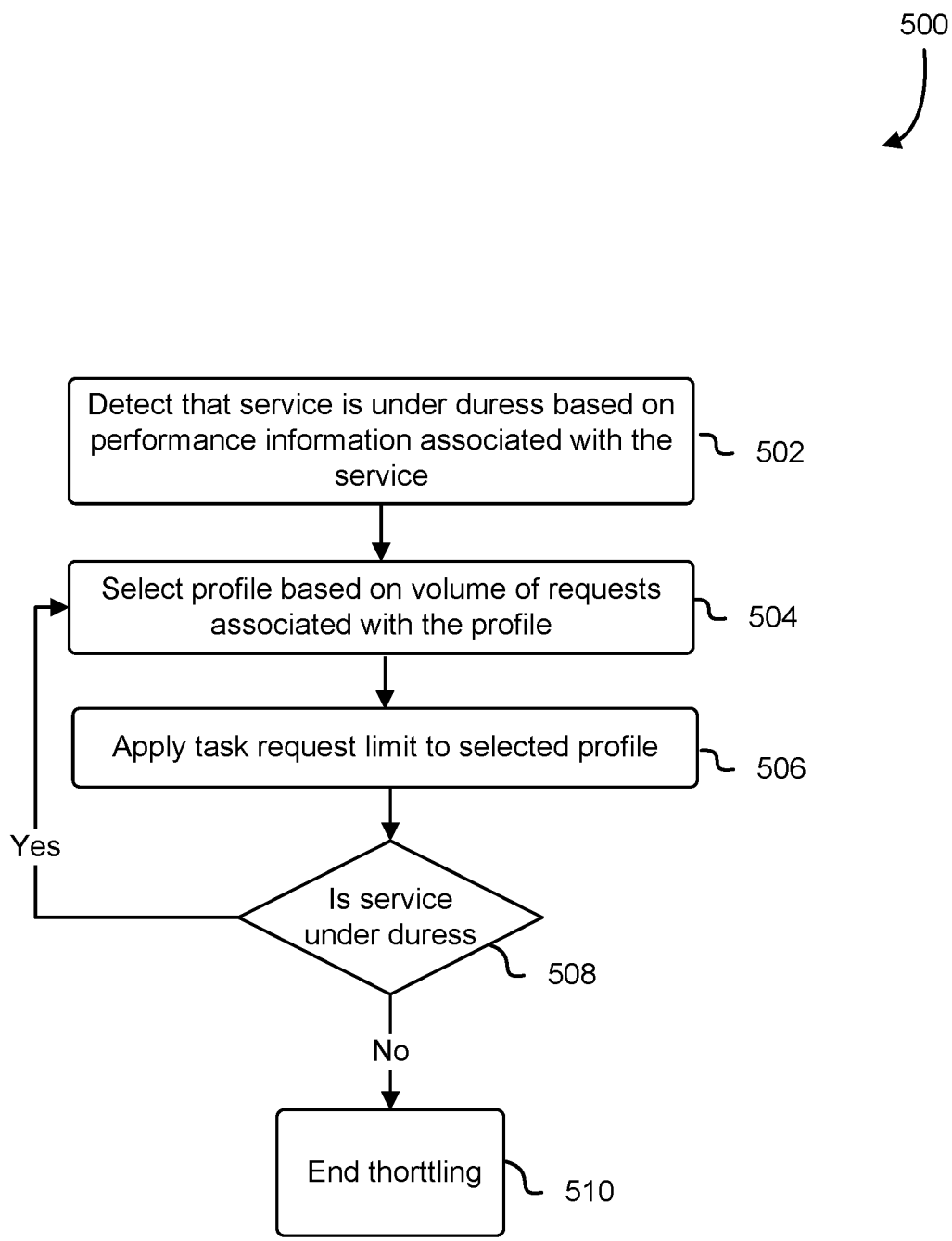
FIG. 5 shows an illustrative example of a process for selectively throttling clients of a service when the service meets a duress condition.

FIG. 5 shows an illustrative example of a process 500 for selectively throttling clients of a service when the service meets a duress condition. In some examples, process 500 may be performed in part or in whole by throttle service 316, throttle engine 304, 404, rate estimator 306, 406, throttle decision maker 308, 408, and/or data collector 310, 410.

Process 500 may begin at operation 502, where the throttle decision maker may be detected that a service is under duress, for example, based on service performance data of the service or dependent services. Next, at operation 504, the throttle service may select a profile or client for throttling, for example based on a volume of requests associated with the profile. Next, the throttle service may apply a task request limit or quota to the selected profile, at operation 506. Process 500 may continue to operating 508, where the throttle decision maker may determine if the service is still under duress. Operation 508, in some examples may include one or more operations of process 600 described below. If the service is determined to be under duress at operation 508, process may loop through operations 504, 506, and 508 one or multiple times, until it is determined that the service is no longer under duress, at which point, process 500 may end at operation 510.

In some cases, selecting a profile at operation 504 to throttle may including identifying a highest request volume client. Process 500 may continue to loop through operations 504, 506, and 508 until the service is no longer under duress, each time selecting a highest request client at operation 504. In some cases, the same client, may continue to be the highest volume client for multiple cycles (e.g., after multiple, successively smaller limits are placed upon requests for that client). In this scenario, the throttling service may continue to reduce the request limit of that client until the request rate of the client is no longer the highest rate of all clients or a subset thereof. At that point, throttling system may select the next highest request rate client and begin to throttle that client. The throttling service may continue to throttle the client having highest volume request until the system is no longer in a state of duress. In this way, the throttling service may attempt to distribute the throttling effect more evenly across clients with the highest request volume.

In some aspects, clients for throttling may be selected based on a change of traffic, such that the client that causes the biggest spike in requests is selected and throttled first, and then the second biggest spike, and so on. In some cases, peak metrics, such as request rate, bandwidth, etc., could be used to select clients for throttling.

In some aspects, one limited request rate may be determined and applied to all selected clients, at operation 506. In this way, the amount of data stored to implement the throttling service may be drastically reduced. The request limit may be determined based on historical request information or other information, such as a calculated or safe value based on stress test results.

In some embodiments, throttling system may continue to select and throttle a single client at operations 504, 506, and 508 a number of times either until the request rate is 0 or close to it, or until a minimum grant rate is met. If the service is still under duress at that point, as determined at operation 508, the throttling service may select the client with the next highest request rate at operation 504, and continue to cycle through operations 504, 506, and 508 until the service is no longer under duress. In this way, the throttling service may attempt to minimize the number of clients throttled to bring the service out of a state of duress.

In yet some embodiments, the throttling service may track and maintain a list of the clients having a request rate above a threshold. When the service is in a state of duress, the throttling system may throttle these subset of clients first, by cycling through operations 504, 506, and 508 for each client of the subset, such as in descending order according to highest request rate, or may apply the same request rate limit to each at once or successively. In this way, the throttling service may attempt to reduce the amount of time it takes to bring the service out of a state of duress and/or reduce the amount of overhead needed to determine the client selected for throttling multiple times.

In some examples, a request quota may be maintained for a subset of clients having a historically large request rate. When the service is in a state of duress, the throttling system may determine if each client of a subset of clients is above their limit by a configured margin to select a profile for throttling, at operation 504. If so, the throttling system may throttle one or more of the clients in the subset request to a predetermined level, to help bring the service out of a state of duress.

Figure 6:
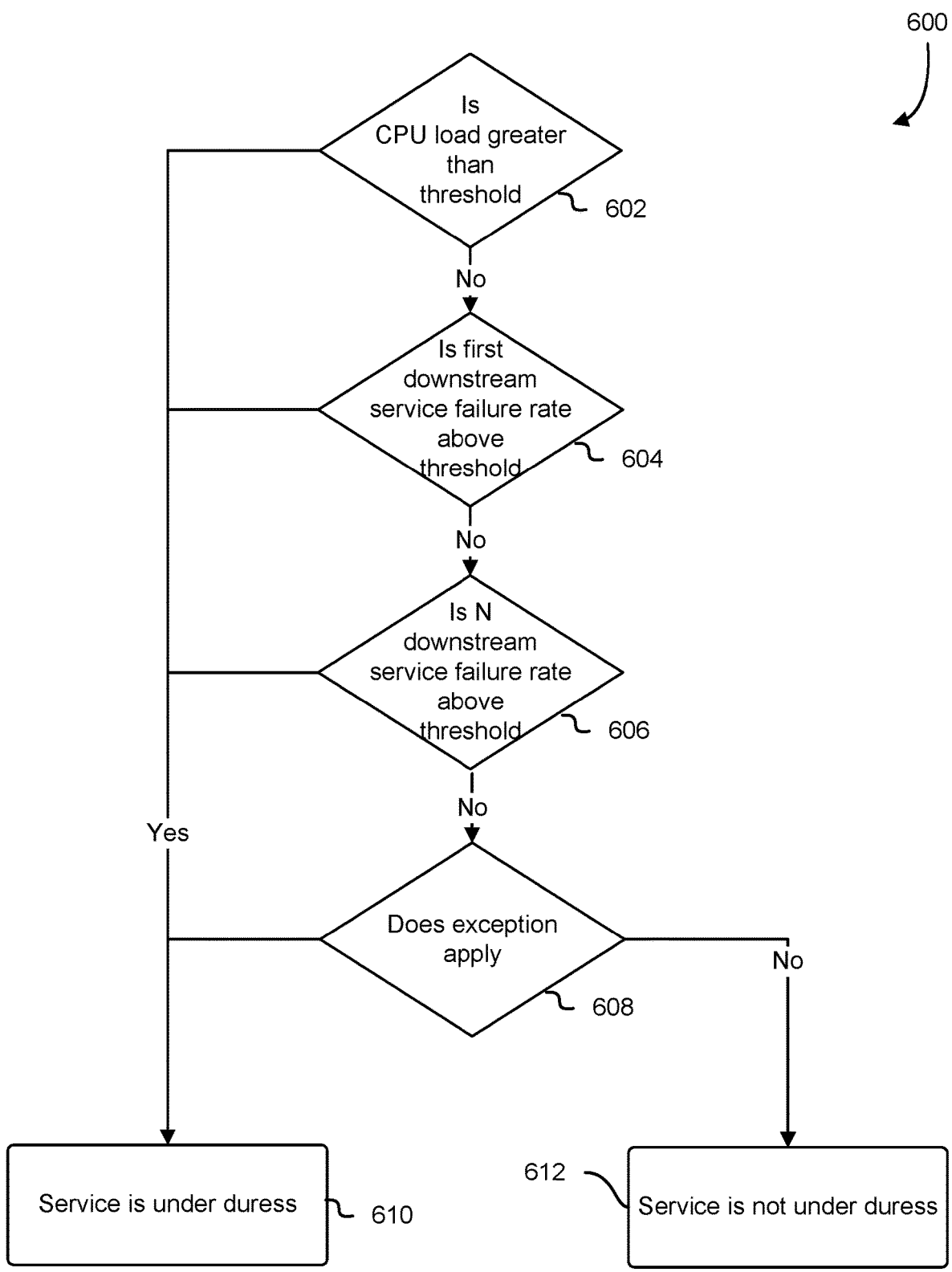
FIG. 6 shows an illustrative example of a process determining whether a service meets a duress condition.

FIG. 6 shows an illustrative example of a process 600 determining whether a service meets a duress condition. In some examples, process 600 may be performed in part or in whole by throttle service 316, throttle engine 304, 404, rate estimator 306, 406, throttle decision maker 308, 408, and/or data collector 310, 410. In some aspects, throttle system 316 and/or throttle decision maker 308, 408, may obtain data for performing process 600 from data collector 310, 410.

The throttle decision maker may determine if a CPU load is greater than a threshold, at operation 602. Operation 602 may be performed for the service as a whole, such as service 102, or individual host machines, such as hosts 104, 106, 108 of system 100, responsible for responding to specific client requests. In some examples, the threshold may be configurable, or set by default, for example at 70%. CPU load is only given by way of example, other metrics may be used to determine if one or more host machines are over or close to, a maximum desired capacity. If the CPU load or other metric is over the threshold, at operator 602, the service may be determined to be under duress, at operation 610.

If the CPU is not over a threshold, as determined at operation 602, process 600 may proceed to operation 604, where the throttle decision maker may determine if a first downstream service failure rate (or throttle rate) is above a threshold. In some examples, the downstream service may include a storage or database service. In yet some examples, the threshold may be a number of request denials or failures in a given period of time, such as more than 0 failures in a preceding 15 second window. If the determination at operation 604 is yes, the service may be determined to be under a state of duress, at operation 610. If not, process 600 may proceed to operation 606 where the failure rate of any remaining downstream services may be compared to a threshold. If any of those determinations are positive, the service may be determined to be under duress at operation 610. If not, the throttle decision maker may apply any additional remaining rules, policies, or exceptions at operation 608 to the received data, to determine if any other conditions warrant the service being in a state of duress. Exceptions 608 may include any of a number of variables, such as time period corresponding to historical high traffic, one or more configurable service thresholds, etc. If no other policy applies, the service may be determined to not be under duress, at operation 612, otherwise, if a policy or exception does apply, the system may be found to be under duress, at operation 610.

It should be appreciated that operations 602, 604, 606, and 608 may be performed in any order, and some or all can be performed in parallel. In some aspects, operations 602, 604, 606, and/or 608 may be performed in an order based on the amount of resource usage each operations takes. In one example, less resource intensive determinations of operations 602, 604, 606, and 608 may be made first to make a determination of whether the service is under duress more quickly and using less resources.

Figure 7:
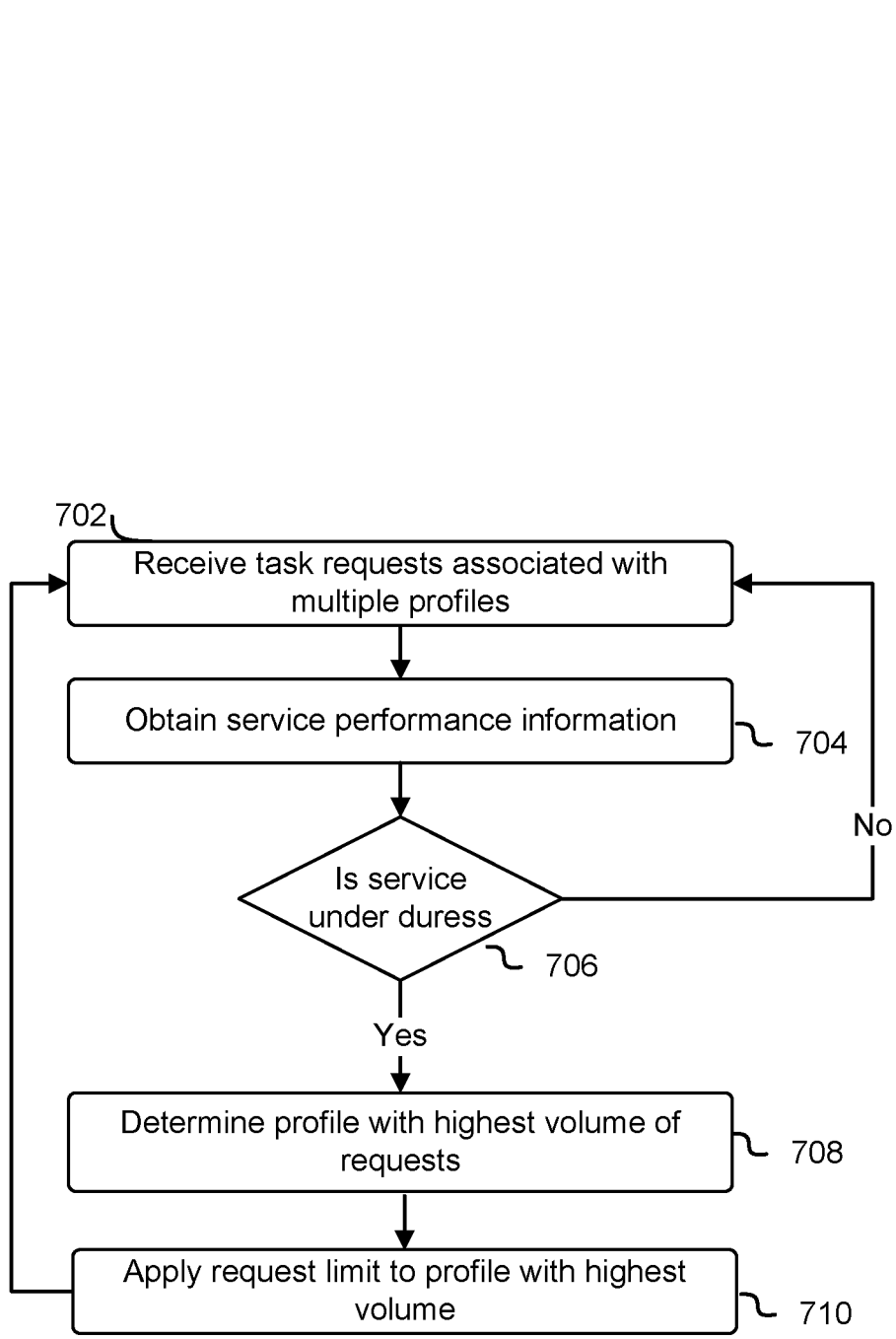
FIG. 7 shows another illustrative example of a process for selectively throttling clients of a service when the service meets a duress condition.

FIG. 7 shows another illustrative example of a process 700 for selectively throttling clients of a service when the service meets a duress condition. In some examples, process 700 may be performed in part or in whole by service, such as service 302, throttle service 316, throttle engine 304, 404, rate estimator 306, 406, throttle decision maker 308, 408, and/or data collector 310, 410, or a combination thereof.

Process 700 may be an alternative process to process 500 described above. In some examples, process 700 may be performed by a throttling system that is part of a service. For example, in process 700, task requests from multiple profiles may be received at operation 702. Next at operation 704, service performance information may be obtained, for example, from the service itself, from host machines or virtual machines of the service (which may be remote), and/or from one or more dependent services, either directly or through a data collector. Next, at operation 706, it may be determined whether the service is under duress. Operation 706 may include some or more operations of process 600 described above. If the service is determined to not be under duress, process 700 may continue to cycle through operations 702, 704 and 706, until the service is determined to be under duress. At which point, process 700 may proceed to operation 708, in which a profile with the highest volume of request may be determined. Next, at operation 710, a request limit may be applied to the selected profile. Process 700 may continue to cycle through operations 702, 704, 706, 708, and 718 until the system is no longer under duress, at which point process 700 may be used to monitor whether the service enters a state of duress.

Figure 8:
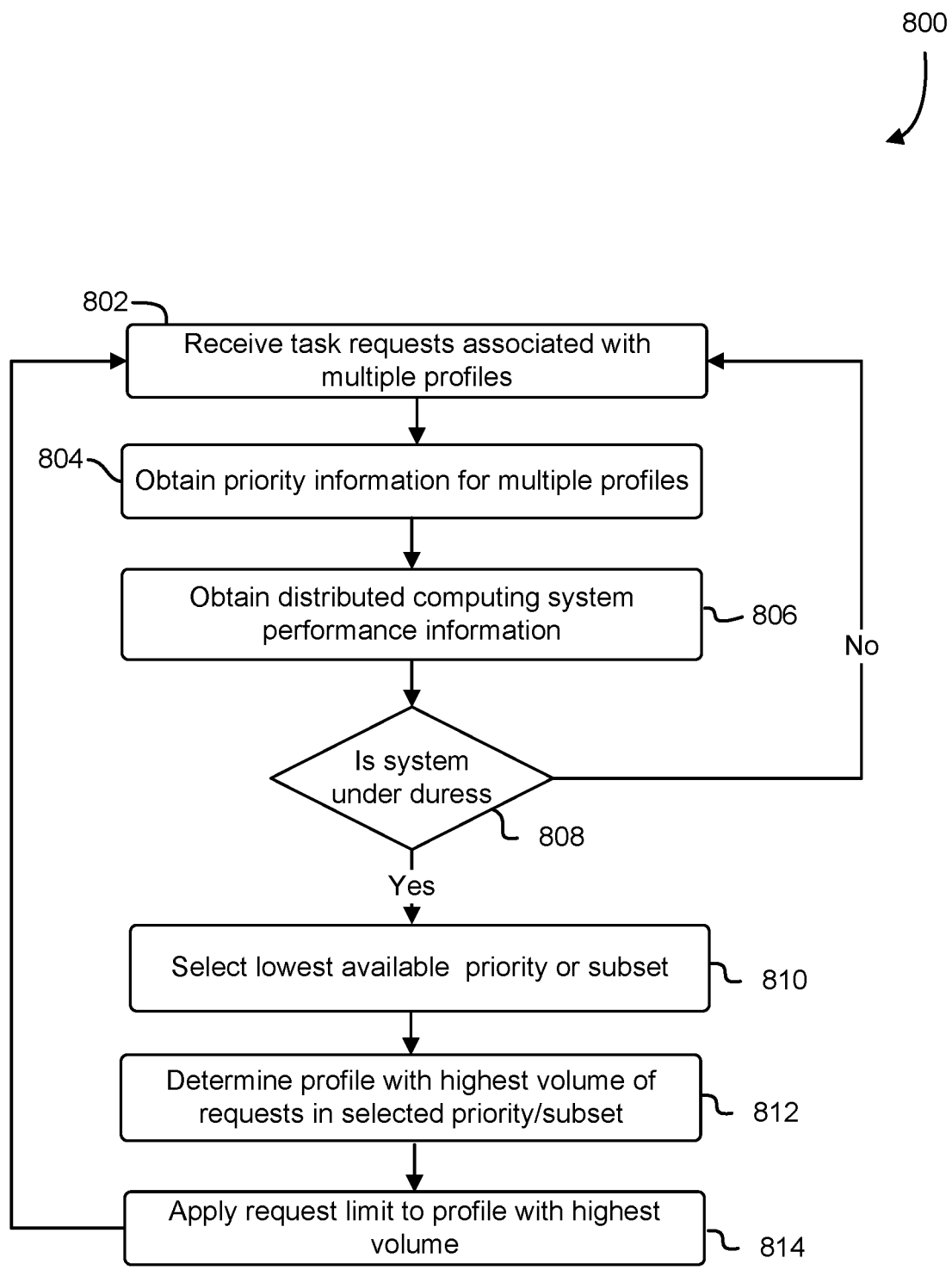
FIG. 8 shows another illustrative example of a process for selectively throttling clients of a service when the service meets a duress condition.

FIG. 8 shows another illustrative example of a process 800 for selectively throttling clients of a service when the service meets a duress condition. In some examples, process 800 may be performed in part or in whole by a service, such as service 302, throttle service 316, throttle engine 304, 404, rate estimator 306, 406, throttle decision maker 308, 408, and/or data collector 310, 410, or a combination thereof.

Process 800 may incorporate one or more aspects of process 700 described above, such as operations 802, 806, and 808, and 814. Process 800 differs from process 700 by selecting groups or subsets of profiles to which to apply requests limits. These groups or subsets may be based on priority, such as higher profile clients, higher paying clients, higher volume clients, and the like. In some examples, these types of metrics may be used to assign a higher priority to certain clients over other clients. Alternatively, clients with highly irregular traffic needs may be given a lower priority. Other groups or subsets may be determined, such as based on volume, geographic location, regularity of requests, type of requests, etc.

In any of these scenarios, the throttling system may obtain group or priority information at operation 804, for example before or after receiving task requests and obtaining service information, at operations 802 and 804, respectively. If the system is under duress, as determined at operation 808, the throttling system may select a subset or priority at operation 810. For example, throttling system may select a lowest available priority having at least one profile in it, and/or that has not been throttled to a certain degree. In some cases, once a priority or subset has been selected, a profile with the highest request volume in that subset may be determined, at operation 812. It should be appreciated that, as described above, other metrics and selection processes for operation 812 may also be implemented. Next, a request limit may be applied to the selected profile, at operations 814, and process 800 may continue to cycle through operations 802, 806, 808, 810, 812, and 814, until the system is no longer under duress. In some cases, operation 804 may be performed selectively, such as not on every cycle, to avoid unnecessary resources being used.

Figure 9:
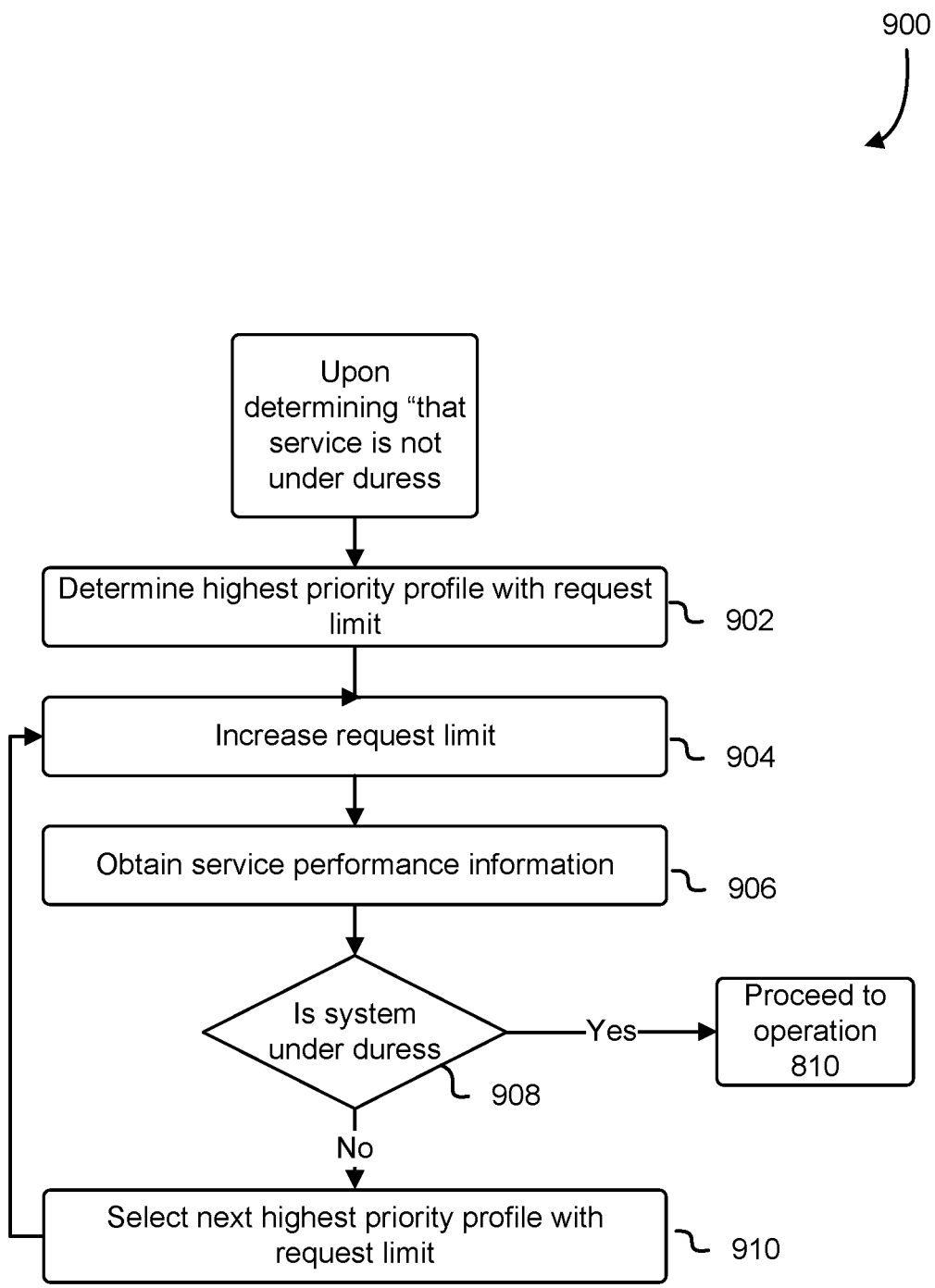
FIG. 9 shows an illustrative example of a process for selectively removing throttling limits placed on clients of a service when the service is no longer under duress.

FIG. 9 shows an illustrative example of a process 900 for selectively removing throttling limits placed on clients of a service when the service is no longer under duress. Process 900 may be performed, for example, at any time the system is not under duress, such as after operations 416, 508, 612, 706, and/or 808 described above in reference to processes 400, 500, 600, 700 and 800. In some examples, process 900 may be performed in part or in whole by a service, such as service 302, throttle service 316, throttle engine 314, 404, rate estimator 306, 406, throttle decision maker 308, 408, and/or data collector 310, 410, or a combination thereof.

Process may begin at operation 902, where a highest priority profile with an applied request limit, quota, or throttle rate may be determined. Next, at operation 904, the request rate associated with that client may be increased. This may include increasing the request rate by a predetermined amount (e.g., fixed for all the clients or a subset thereof), an amount proportional to the request volume of the client or the throttle applied, incrementally, such that more than one increase will bring the request rate up to a pre-throttled value, or by some other adjustment.

Next, at operation 906, service performance information may be obtained. The service may then be examined to see if it is under duress, or if it has hit a workload threshold (e.g., a threshold that is lower than a duress threshold, but still offers increases service utilization), at operation 908. If the system is under duress, process 900 may return to operation 810 of process 800, where clients may be selected for throttling. Alternatively, the rate increase or increases applied in process 900 may be reversed, before active throttling is applied to other clients, according to process 800. If the system is not under duress, at operation 908, process 900 may proceed to operation 910, where a next highest volume profile may be selected. Process 900 may loop back to operation 904, 906, 908, and 910 until the system is again determined to be under duress, or until another threshold is reached. For example, a preferred working load or threshold may be configured, which may be lower than the one or more thresholds for a duress state. In this way, the throttling system may avoid placing the service under duress after it has removed it from that state, while increasing service utilization.

Figure 10:
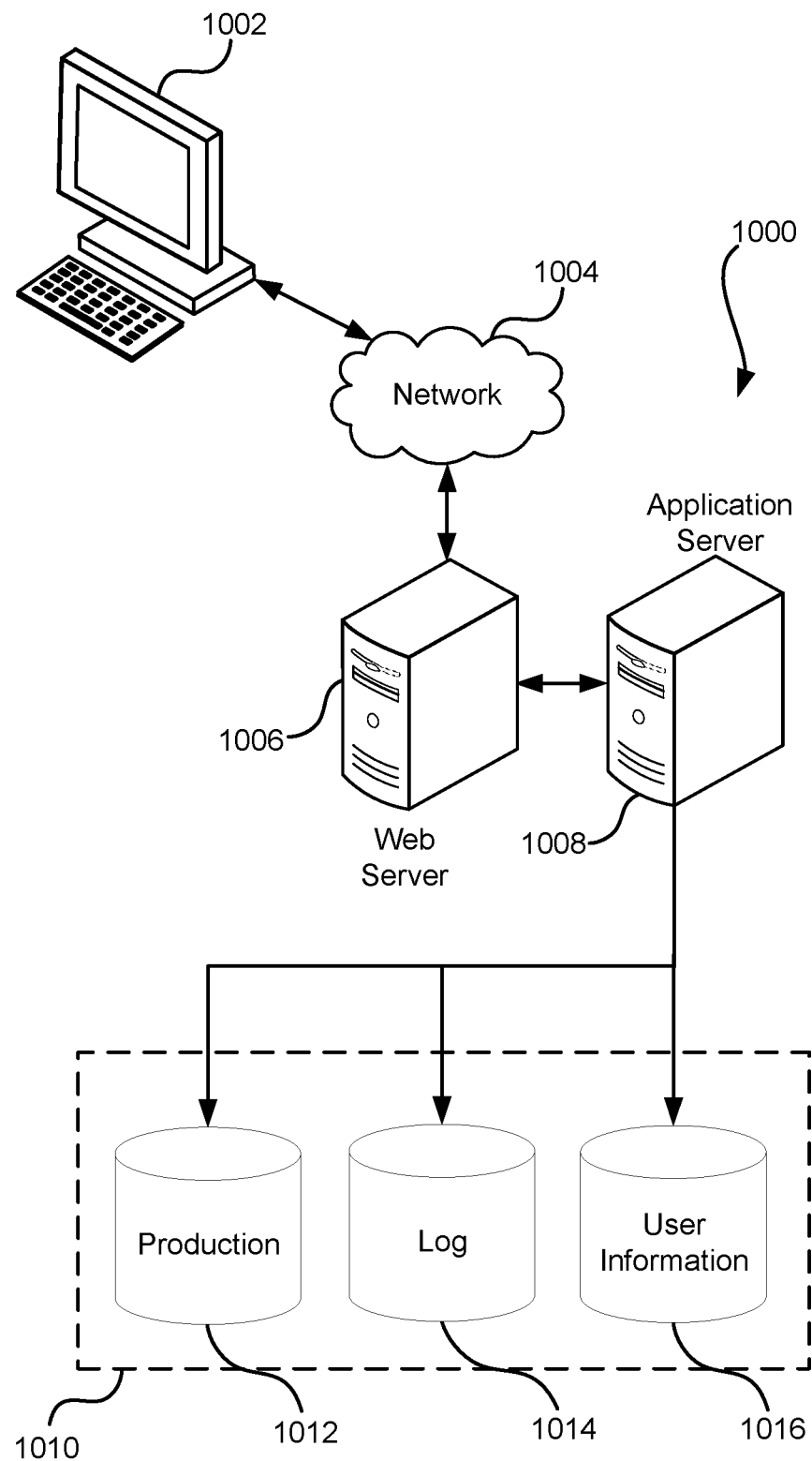
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update or otherwise process data in response thereto and the application server 1008 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1002. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving a plurality of task requests at a service from a plurality of clients, the service being a computer system to which task requests are submittable over a network;
obtaining performance information of the service and a downstream service;
detecting that the downstream service is throttling requests, received from the service, at a first throttling rate based on a number of request denials received by the service from the downstream service in a period of time;
using the obtained performance information and based on determining that the first throttle rate is above a failure throttle rate threshold, determining that the service is under duress;
responsive to determining that the service is under duress, successively performing the following operations multiple times until the service is determined to not be under duress, wherein at least two times of the multiple times that the following operations are performed, a different subset of clients is selected from the plurality of clients:
  selecting a subset of clients from the plurality of clients based on a respective volume of requests associated with individual clients of the subset of clients;
  applying a throttle to the selected subset of clients; and
  determining whether the service is still under duress.

2. The computer-implemented method of claim 1, wherein selecting the client from the plurality of clients based on the respective volume of requests associated with the client further comprises:
  identifying a group of the plurality of clients based on priority values associated with the plurality of clients, wherein the priority values are independent of the respective volume of requests associated with the group of the plurality of clients; and
  selecting the subset of clients from the group of the plurality of clients based on a respective volume of requests associated with the individual clients of the subset of clients.

3. The computer-implemented method of claim 1, further comprising:
  determining that the service is not under duress; and
  responsive to determining that the service is not under duress, successively, until the service is determined to meet or exceed a workload threshold:
    selecting a client from the plurality of clients based on a respective volume of requests associated with the client;
    increasing a request grant rate for the selected client; and
    determining whether the service is under duress.

4. The computer-implemented method of claim 1, wherein determining that the service is under duress further comprises:
  determining that a processing utilization of the service is above a processing utilization threshold.

5. A system, comprising at least one computing device configured to implement one or more services, wherein the one or more services:
  detect that a service is under duress based on performance information associated with the service and based on detecting that responses, indicating a failure, from a downstream service responsive to requests received from the service, are received at a first failure rate that is above a failure rate threshold, wherein the service receives a plurality of task requests associated with a plurality of profiles; and
  responsive to detecting that the service is under duress, successively perform the following set of operations at least two times, until it is determined that the service is no longer under duress:
    select a subset of profiles from the plurality of profiles based on a respective volume of requests associated with individual profiles of the plurality of profiles, the subset of profiles comprising individual profiles having a highest volume of requests of the plurality of requests, individual profiles of the plurality of profiles associated with a client device;
    apply a task request limit to the subset of profiles; and
    detect whether the service is still under duress.

6. The system of claim 5, wherein the one or more services determine that the downstream service is throttling requests, received from the service, at the first throttle rate.

7. The system of claim 5, wherein applying the task request limit to the subset of profiles comprises applying a first task request limit to each profile from the subset of profiles.

8. The system of claim 5, wherein selecting the subset of profiles from the plurality of profiles based on the respective volume of requests associated with the individual profiles further comprises:
  selecting the individual profiles from the plurality of profiles additionally based on a priority associating with each of the individual profiles.

9. The system of claim 8, wherein selecting the subset of profiles from the subset of the plurality of profiles having the highest volume of requests further comprises:
  probabilistically estimating the volume of requests for the subset of the plurality of profiles.

10. The system of claim 8, wherein the subset of the profiles comprises a first subset associated with a lowest priority of profiles, and wherein, upon selecting all the profiles of the first subset of profiles, selecting the subset of profiles from the plurality of profiles based on the respective volume of requests associated with the at least one profile further comprises:
  identifying a second subset of the plurality of profiles associated with a second lowest profile; and
  selecting at least one profile from the second subset of the plurality of profiles having a highest volume of requests.

11. The system of claim 5, wherein the one or more services further:
  detect that the service is not under duress; and
  responsive to detecting that the service is not under duress,
  increase a request grant rate for at least one of the subset of profiles.

12. The system of claim 5, wherein the one or more services further:
  detect that the service is not under duress; and
  responsive to detecting that the service is not under duress, discontinue to apply a task request limit to a number of task requests granted for at least one of the subset of profiles.

13. The system of claim 5, wherein duress comprises a processing utilization being above a processing utilization threshold.

14. The system of claim 5, wherein the one or more services further:
  obtain blacklist information associated with a first profile of the plurality of profiles; and
  limit a number of task requests granted for a first profiles independent of a number or volume of task requests associated with the first profile.

15. The system of claim 5, wherein the volume of requests comprises at least one of a number of requests or a volume of data associated with the requests.

16. A non-transitory computer-readable storage medium having stored thereon executable instructions that, as a result of being executed by one or more processors of a computer system, cause the computer system to at least:
  detect that a service is under duress based at least in part on detecting that a downstream service is throttling requests received from the service at a first throttle rate that is above a failure throttle rate threshold, wherein the first throttle rate is determined based on a number of request denials received by the service from the downstream service in a period of time, wherein the service receives a plurality of task requests associated with one or more profiles; and responsive to detecting that the service is under duress, successively perform the following operations multiple times until the service is detected to not be under duress, wherein at least two times of the multiple times that the following operations are performed, a different profile is selected from the one or more profiles:

select a profile from the one or more profiles having a respective volume of requests associated with the profile above a threshold, the profile associated with a highest request number or request volume of the one or more profiles and associated with a client;

apply a task request limit to the profile; and detect whether the service is still under duress.

17. The non-transitory computer-readable storage medium of claim 16, wherein the instructions for selecting the profile from the one or more profiles having the highest respective volume of requests associated with the profile further comprise instructions that, as a result of being executed by the one or more processors, cause the computer system to:

select a profile from the one or more profiles, associated with a low priority.

18. The non-transitory computer-readable storage medium of claim 16, wherein the instructions that cause the computer system to detecting that the service is under duress further include instructions that cause the computer system to:

detect that a processing utilization of the service is above a processing utilization threshold.

19. The non-transitory computer-readable storage medium of claim 16, wherein the instructions, as a result of being executed by one or more processors of the computer system, further cause the computer system to at least:

detect that the service is not under duress; and responsive to detecting that the service is not under duress, successively, until the service is detected to meet or exceed a workload threshold:

select a profile from the one or more profiles having a task request limit applied to it;

increase a request grant rate for the selected profile; and detect whether the service meets or exceeds the workload threshold.

20. The non-transitory computer-readable storage medium of claim 19, wherein the instructions for increasing the request grant rate for the selected profile further include instructions for incrementally increasing the request grant rate.

* * * * *